(12) United States Patent
Proebstel et al.

(10) Patent No.: US 9,204,211 B2
(45) Date of Patent: Dec. 1, 2015

(54) PAD-TYPE DEVICE CASE PROVIDING ENHANCED AUDIO FUNCTIONALITY AND OUTPUT

(75) Inventors: Robert C. Proebstel, Beaverton, OR (US); Patrick A. Quinn, Aloha, OR (US); Manpreet S. Kharia, Portland, OR (US); Thomas Irrgang, Portland, OR (US); Nigel D. Waites, Lakeville, MN (US); Ian J. Myles, Sunnyvale, CA (US)

(73) Assignee: Avnera Corporation, Beaverton, OR (US)

( * ) Notice: Subject to any disclaimer, the term of this patent is extended or adjusted under 35 U.S.C. 154(b) by 478 days.

(21) Appl. No.: 13/419,222

(22) Filed: Mar. 13, 2012

(65) Prior Publication Data

US 2013/0156219 A1 Jun. 20, 2013

Related U.S. Application Data

(60) Provisional application No. 61/576,863, filed on Dec. 16, 2011.

(51) Int. Cl.
| | | |
|---|---|---|
| *H04R 1/02* | (2006.01) | |
| *H05K 5/00* | (2006.01) | |
| *H04R 1/28* | (2006.01) | |
| *H04R 3/00* | (2006.01) | |
| *H04R 29/00* | (2006.01) | |

(52) U.S. Cl.
CPC .............. *H04R 1/2803* (2013.01); *H04R 3/005* (2013.01); *H04R 1/026* (2013.01); *H04R 29/00* (2013.01); *H04R 2225/33* (2013.01); *H04R 2400/03* (2013.01); *H04R 2420/07* (2013.01)

(58) Field of Classification Search
CPC .... H04R 1/2819; H04R 1/2826; H04R 1/345; H04R 1/2803; H04R 1/026; H04R 3/005; H04R 29/00; H04R 2225/33; H04R 2400/03; H04R 2420/07
USPC ......... 381/337, 338, 339, 352, 160, 349, 350, 381/351, 302, 86, 389, 342, 386, 345, 332, 381/333, 334; 181/148, 155, 196, 199, 156, 181/145, 296, 197
See application file for complete search history.

(56) References Cited

U.S. PATENT DOCUMENTS

| | | |
|---|---|---|
| 4,313,032 A | 1/1982 | Thomas et al. |
| 4,348,549 A | 9/1982 | Berlant |
| 4,628,528 A | 12/1986 | Bose et al. |
| 4,790,408 A | 12/1988 | Adair |

(Continued)

*Primary Examiner* — Vivian Chin
*Assistant Examiner* — William A Jerez Lora
(74) *Attorney, Agent, or Firm* — Marger Johnson

(57) ABSTRACT

A soundskin for a pad-type device comprises a housing, at least one microphone, a signal processing device, at least one audio transducer, and an acoustic waveguide. The housing receives a pad-type device. The signal processing device receives a signal from a pad-type device when the pad-type device is received by the housing. The signal processing device provides a directive sound enhancement of the audio input signals based on room acoustics, such as reverberation, echo, noise, delay, frequency response, and/or speaker-positional information that is determined by the signal processing device. The audio transducer device generates an audible audio output in response to an audio signal output from the signal processing device. The acoustic waveguide receives the audible audio output and generates an enhanced bass audio output from the acoustic waveguide.

26 Claims, 10 Drawing Sheets

(56) References Cited

U.S. PATENT DOCUMENTS

| | | |
|---|---|---|
| 4,893,343 A | 1/1990 | Bader |
| 5,163,167 A | 11/1992 | Heil |
| 5,170,435 A | 12/1992 | Rosen et al. |
| 5,187,333 A | 2/1993 | Adair |
| 5,218,175 A | 6/1993 | Scarlata |
| 5,313,525 A | 5/1994 | Klasco |
| 5,588,063 A | 12/1996 | Edgar |
| 5,740,259 A | 4/1998 | Dunn |
| 5,742,690 A | 4/1998 | Edgar |
| 5,805,708 A | 9/1998 | Freadman |
| 5,900,593 A | 5/1999 | Adamson |
| 5,956,411 A | 9/1999 | Edgar |
| 5,970,158 A | 10/1999 | Beltran |
| 6,223,853 B1 | 5/2001 | Huon et al. |
| 6,278,789 B1 | 8/2001 | Potter |
| 6,343,133 B1 | 1/2002 | Adamson |
| 6,628,796 B2 | 9/2003 | Adamson |
| 6,704,425 B1 | 3/2004 | Plummer |
| 6,771,787 B1 | 8/2004 | Hoefler et al. |
| 6,931,143 B2 | 8/2005 | Caron et al. |
| 7,010,138 B1 | 3/2006 | Harris et al. |
| 7,392,880 B2 | 7/2008 | Buck |
| 7,565,948 B2 | 7/2009 | Parker et al. |
| 7,584,820 B2 | 9/2009 | Parker et al. |
| 2004/0022405 A1 | 2/2004 | Caron et al. |
| 2008/0152181 A1* | 6/2008 | Parker et al. .................. 381/345 |
| 2011/0255702 A1* | 10/2011 | Jensen ............................ 381/66 |
| 2011/0298736 A1 | 12/2011 | Madonna et al. |
| 2012/0211382 A1* | 8/2012 | Rayner ........................... 206/320 |
| 2012/0289291 A1* | 11/2012 | Moran et al. ................... 455/566 |

* cited by examiner

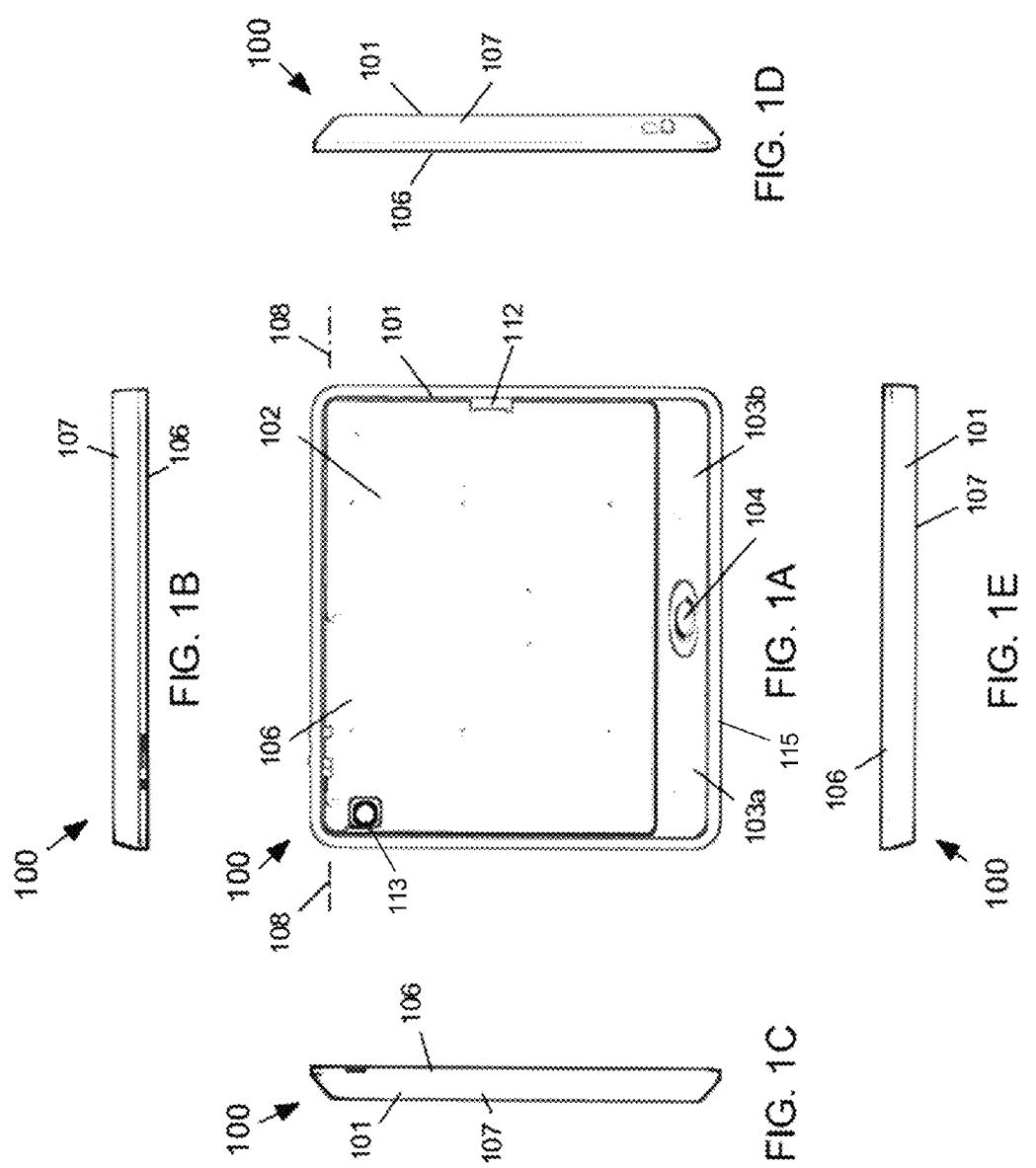

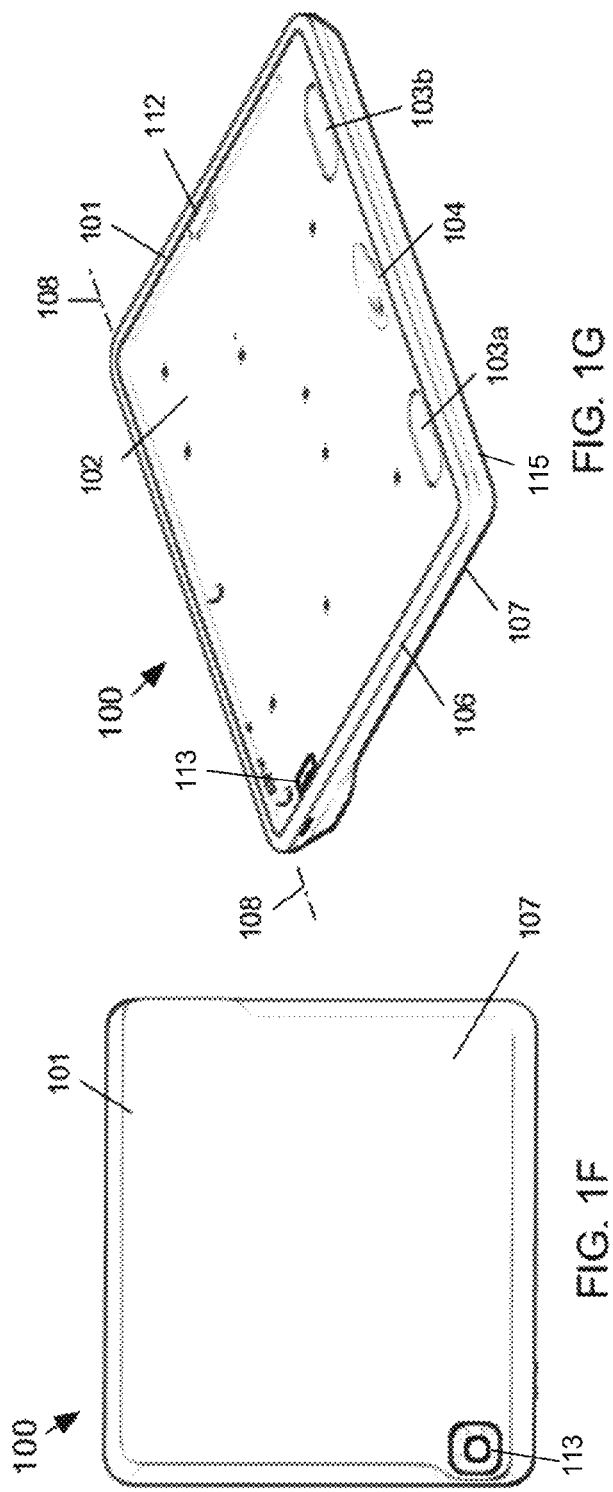

PAD-TYPE DEVICE CASE PROVIDING ENHANCED AUDIO FUNCTIONALITY AND OUTPUT

CROSS-REFERENCE TO RELATED PATENT APPLICATION

The present patent application claims priority to U.S. Provisional Patent Application Ser. No. 61/576,863, filed Dec. 16, 2011, entitled "Pad-type Device Case Providing Enhanced Audio Functionality And Output," and invented by Robert C. Proebstel, the disclosure of which is incorporated by reference herein.

BACKGROUND

The subject matter disclosed herein relates to personal electronic multi-media device. More particularly, the subject matter disclosed herein relates to a case for a personal electronic multi-media pad device (pad-type device) that provides an enhanced audio output when a pad-type device is coupled to the case.

As personal electronic devices become smaller and provide more multi-media entertainment features and capable, one of the disadvantages that accompanies the trend toward the smaller size is that the audio speakers contained in such a pad-type device also tends to be smaller, thereby providing a less than satisfactory audio experience.

BRIEF DESCRIPTION OF THE DRAWINGS

The subject matter disclosed herein is illustrated by way of example and not by limitation in the accompanying figures in which like reference numerals indicate similar elements and in which:

FIGS. 1A-1G respectively depict top, back, left-side, right-side, front, bottom and top perspective views of an exemplary embodiment of a soundskin device for a pad-type device (not shown) according to the subject matter disclosed herein;

DETAILED DESCRIPTION

Figure 2A:
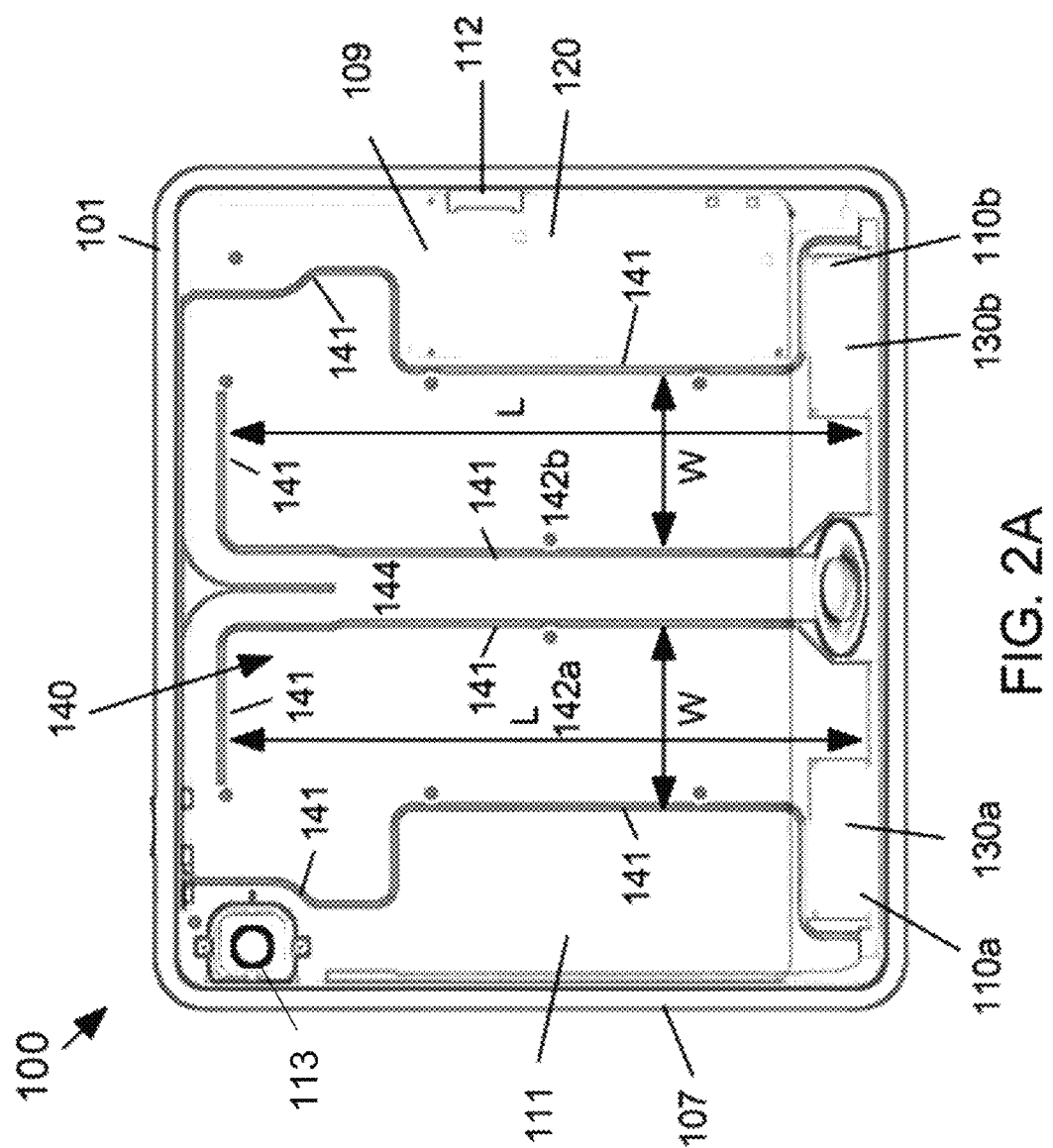
FIGS. 2A and 2B respectively depict an internal top view and an internal top perspective view of the exemplary embodiment of the soundskin device depicted in FIGS. 1A-1G according to the subject matter disclosed herein.

As used herein, the word "exemplary" means "serving as an example, instance, or illustration." Any embodiment described herein as "exemplary" is not to be construed as necessarily preferred or advantageous over other embodiments. Additionally, it will be appreciated that for simplicity and/or clarity of illustration, elements illustrated in the figures have not necessarily been drawn to scale. For example, the dimensions of some of the elements may be exaggerated relative to other elements for illustrative clarity. Further, in some figures only one or two of a plurality of similar elements indicated by reference characters for illustrative clarity of the figure, whereas all of the similar element may not be indicated by reference characters. Further still, it should be understood that although some portions of components and/or elements of the subject matter disclosed herein have been omitted from the figures for illustrative clarity, good engineering, construction and assembly practices are intended.

As used herein, the terms "pad," "electronic pad-type device," "pad-type device," "tablet," "tablet-type device," "multi-media computing device," "smartphone," "smartphone-type device," "personal multi-media electronic tablet," "personal multi-media electronic device," and "electronic pad device" are intended to be interchangeable terms and are intended to refer to similar type devices. Exemplary pad-type devices include, but are not limited to, an iPad, an iPhone, a media player, a handheld-computing device, or a handheld multimedia device.

FIGS. 1A-1G respectively depict top, back, left-side, right-side, front, bottom and top perspective views of an exemplary embodiment of a soundskin device 100 for a pad-type device (not shown) according to the subject matter disclosed herein. Soundskin device 100 provides a robust stereo audio output with an enhanced-bass for a pad-type device while also providing a protective cover for the pad-type device. In particular, soundskin device 100 comprises a case or housing 101 is adapted to receive a pad-type device (not shown) in a recessed-well region 102 that is formed on the top side of soundskin 100 and best seen in FIG. 1G. It should be understood that the shape of recessed-well region 102 could be specifically configured for any particular pad-type device. It should also be understood that an exemplary embodiment of a soundskin device could be configured so that a pad-type device could slide into and be captively held by the soundskin, and/or be placed within the soundskin with a hinged portion of the soundskin closing over and captively holding the pad-type device.

Case 101 encloses an audio processing device, such as an audio amplifier with functional controls, two audio transducers (i.e., speakers), an audio enhancement acoustic waveguide structure, and a power source. The audio processor device drives the audio transducers in a well-known manner to generate an audio output that is projected from the front side of the audio transducers and through apertures 103a, 103b. According to the subject matter disclosed herein, the audio output that is generated from the back side of each transducer is channeled through an acoustic waveguide structure that is adapted to enhance the bass response of the audio transducers. The output of the acoustic waveguide structure is through a bass output aperture 104. The acoustic waveguide structure provides a richer, fuller-sounding audio output in comparison to the audio output from only the front side of the audio transducers.

In one exemplary embodiment, case 101 is formed by a top cover 106 and a bottom cover 107. Top cover 106 is releasably hinged to bottom cover 107 along an axis 108 so that top cover 106 and bottom cover 107 open and close in a clam-shell manner along axis 108, thereby making the internal components of the soundskin accessible. The hinging (not shown) is releasable so that top cover 106 can be conveniently separated from bottom cover 107. In another exemplary embodiment, top cover 106 comprises an integral protective screen cover (not shown) that protects a pad-type device when the pad-type device is received into recessed-well region 102. In one exemplary embodiment, the protective screen cover provides a see-through window that permits the display of the pad-type device to be seen and provides openings through which the audio output from the soundskin device can pass. In one exemplary embodiment, the protective screen cover provides openings through which the audio output from the soundskin device can pass and/or an opaque cover to the pad-type device. In another exemplary embodiment, the integral protective screen cover is hinged at or near axis 108 and can be rotated from a closed position and positioned at a selected angle with respect to the bottom of the soundskin device, thereby permitting a user to view the pad-type device at a selected angle.

Figure 4B:
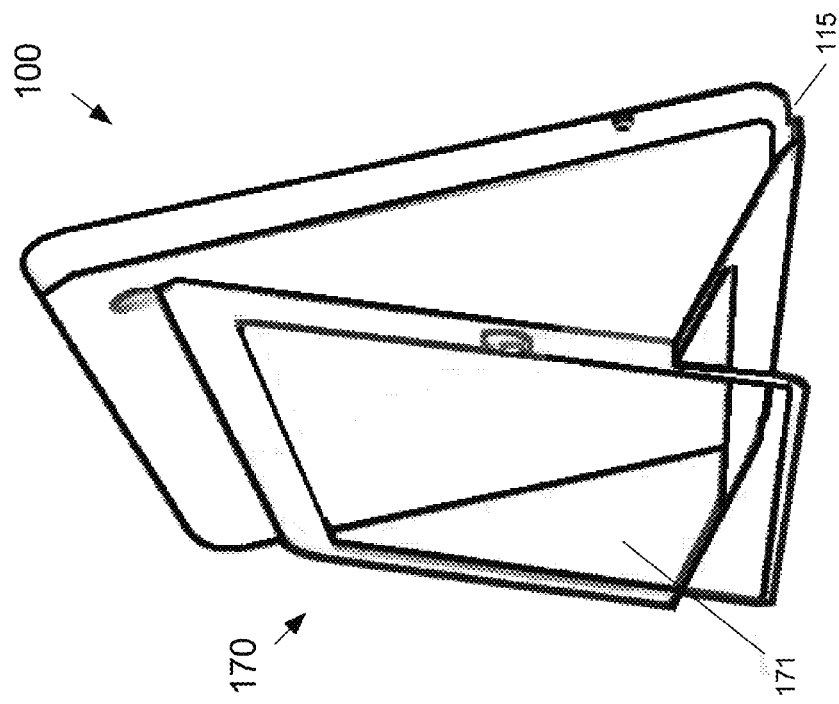
FIGS. 4A and 4B respectively depict front and back perspective views of an exemplary embodiment of a protective screen cover for a soundskin.
Figure 4A:
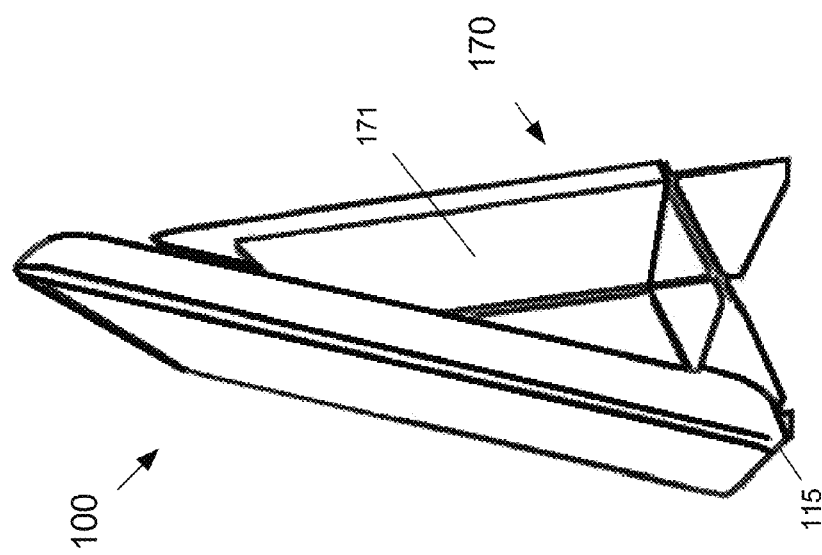

In an alternative exemplary embodiment, the integral protective screen cover is hinged at or near front edge 115. FIGS. 4A and 4B respectively depict front and back perspective views of an exemplary embodiment of a protective screen cover 170 for a soundskin that is hinged at or near front edge 115. In particular, protective screen cover 170 is shown in an open position, thereby supporting a pad-type device in a semi-vertical position. Protective screen cover 170 is coupled to soundskin 100 by a hinge (not shown) near the bottom end 115 of soundskin 100. Protective screen cover 170 comprises a screen 171 that permits the display of a pad-type device to be viewed when protective cover 170 is a closed position.

In one exemplary embodiment, soundskin device 100 includes a camera lens piece 113 provides a lens function for a camera contained in a pad-type device. In another exemplary embodiment of soundskin device 100, camera lens piece 113 also provides a release mechanism to mechanically release a pad-type device from the soundskin device. For the lens function, camera lens piece 113 comprises a lens that allows light to pass from the bottom of the soundskin device to the lens of a camera of a pad-type device. For the release mechanism, lens piece 113 can be depressed from the bottom side of soundskin 100 by a user and a cylindrical member containing the lens moves toward the top of the soundskin device, thereby lifting a pad-type device contained in recessed-well region 102 and allowing a user to grip the edges of the pad-type device. It should be understood that the exemplary embodiment of camera lens piece 113 is merely an example and other embodiments are contemplated. In another exemplary embodiment, the camera lens piece 113 can be replaced by an aperture that provides a viewing port for the lens of a camera of a pad-type device.

Figure 2B:
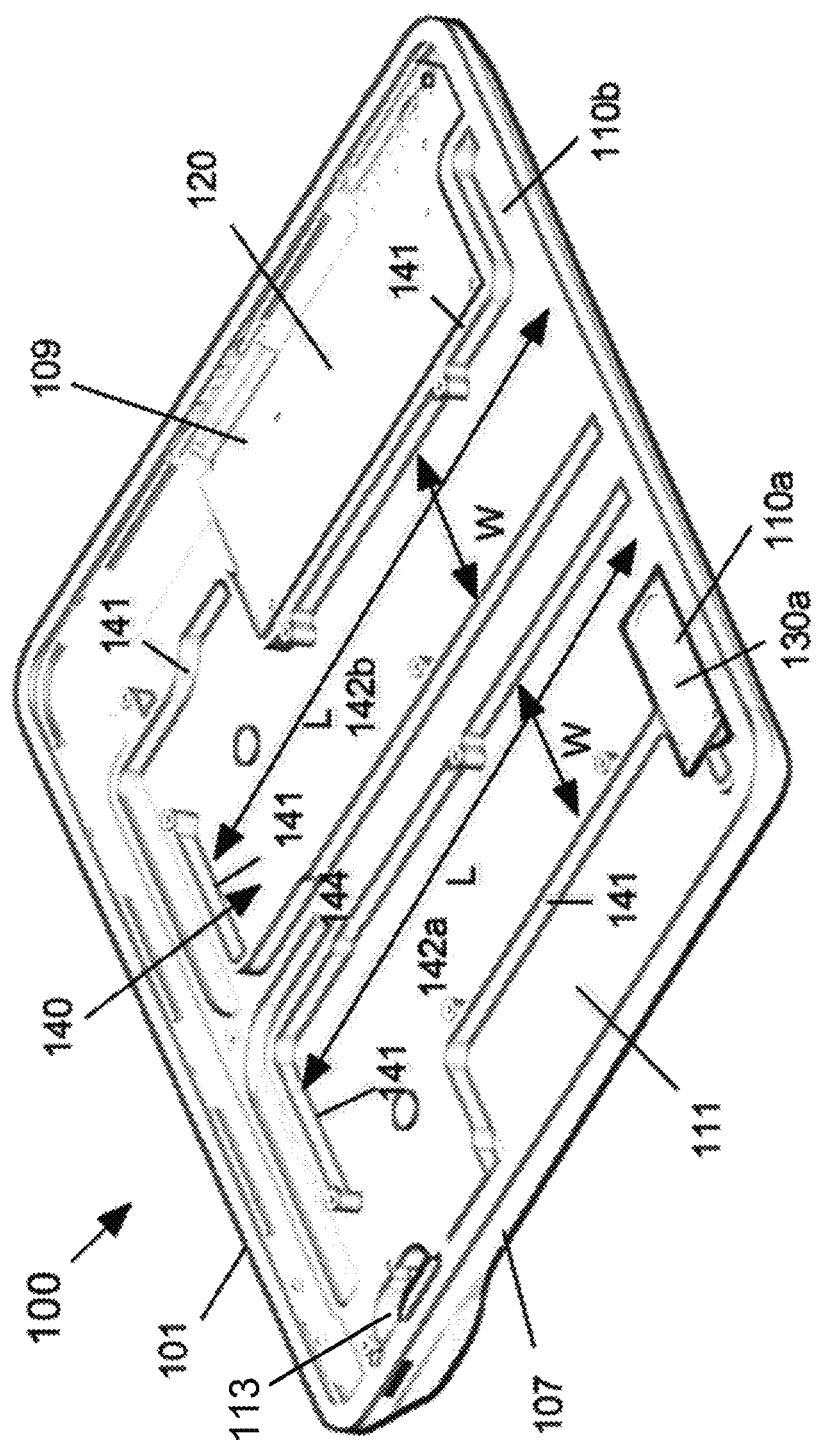

FIGS. 2A and 2B respectively depict an internal top view and an internal top perspective view of the exemplary embodiment of soundskin device 100 depicted in FIGS. 1A-1G according to the subject matter disclosed herein. As depicted in FIGS. 2A and 2B, the bottom cover 107 of soundskin 100 comprises space 109 for an audio processing device 120, space 110a, 110b for each of two audio transducers 130a, 130b (of which only audio transducer 130a is shown in FIG. 2B), an audio enhancement acoustic waveguide structure 140, and space 111 for a power source 160 (not shown in FIG. 2A or 2B), such as a battery. It should be noted that FIG. 2A depicts bass output aperture 104, although base output aperture 104 is part of cover 106.

Figure 3:
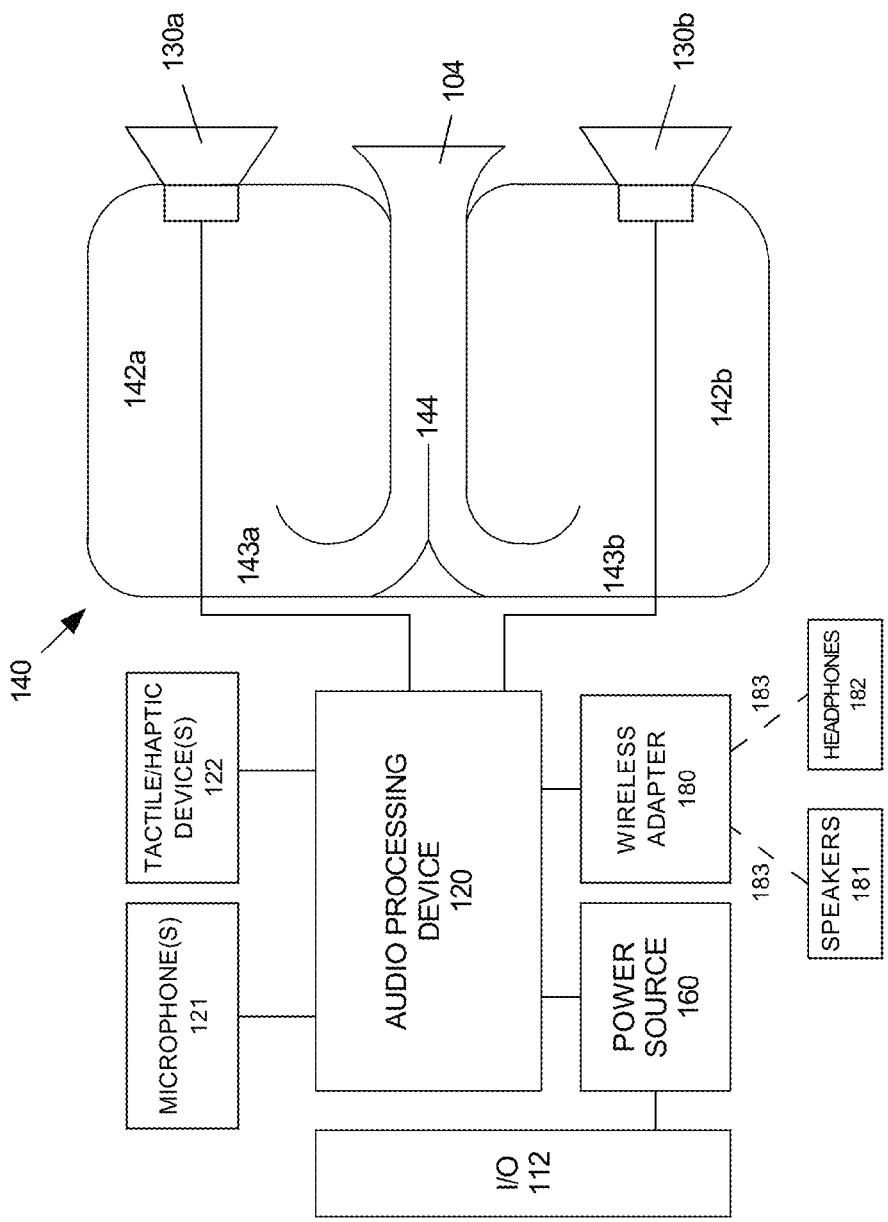
FIG. 3 depicts a functional block diagram of the exemplary embodiment of a soundskin device according to the subject matter disclosed herein.

FIG. 3 depicts an exemplary functional block diagram of the exemplary embodiment of soundskin device 100. Audio signal processing device 120 receives an audio output signal from the pad-type device through, for example, I/O connector 112 (shown in FIGS. 1A, 1G and 2A) and provides audio-signal processing in a well-known manner, such as, but not limited to, amplification, and audio frequency response enhancement and reduction. Audio signal processor device 120 is coupled to and drives audio transducers 130a, 130b in a well-known manner to generate an audio output that is projected from the front side of transducers 130a, 130b, and out through apertures 103a, 103b. The audio output that is generated from the back side of each transducer 130a, 130b is contained by the acoustic waveguide structure 140 and channeled through aperture 104. Power source 160 is coupled to and provides power to audio processor device 120 in a well-known manner. In one exemplary embodiment, audio processing device 120 is coupled to audio transducer, such as audio speakers 181 and/or headphones 182 through a wireless adapter 180 that provides an optical and/or a radio frequency (RF) link 183, such as, but not limited to, a Bluetooth-type link and/or a WiFi-type link, to audio speakers 181 and/or headphones 182. In another exemplary embodiment, the link between wireless adapter 180 and audio speakers 181 and/or headphones 182 is a bi-directional link. In still another exemplary embodiment, the link between wireless adapter 180 and headphones 182 is an output-directive link in which the output from the soundskin device is directed to headphones 182. In yet another exemplary embodiment, wireless adaptor 180 provides a bi-directional wireless link between soundskin 100 and an external device, such as, but not limited to, a data source and/or an Internet connection. It should also be understood that the spaces for the various functional components depicted in FIG. 2B are merely exemplary and could be arranged differently and/or to include more or fewer functional components.

In one exemplary embodiment, acoustic waveguide structure 140 comprises walls 141 that are configured to form chambers 142a, 142b, a waveguide 143a, 143b, an acoustic waveguide mixing region 144, and an acoustic output channel 145, which is fluidly coupled to bass output aperture 104. Chambers 142a, 142b are configured so that a length L and a width W of the chamber enhances a bass response of the audio transducers. In one exemplary embodiment, walls 141 are joined to bottom portion 107 so that there is a smooth radius of curvature where wall 141 joins bottom portion 107 in order to minimize air turbulence and provide optimum and efficient audio enhancement. Acoustic waveguide mixing region 144 is configured to couple the respective audio signals from chambers 142a, 142b.

It should be understood that the exemplary configuration of acoustic waveguide structure 140 and the arrangement of audio processor device 120, transducers 130a, 130b, and power source 160 depicted in FIGS. 2A and 2B is merely one exemplary configuration. Other configurations are possible. In another exemplary embodiment, one or more additional acoustic waveguide structures could be included to enhance selected portions of the audio frequency band.

In one exemplary embodiment, the soundskin device according to the subject matter disclosed herein comprises a microphone 121 that detects audio signals that are processed by, for example, audio processing device 120. In another exemplary embodiment, the soundskin device according to the subject matter disclosed herein comprises at least two microphones 121 configured in a spatial-diversity microphone arrangement that passes their respective signals through optional amplifiers (not shown) and then to digitizers that are part of, for example, audio processor device 120. The digitized microphone signals are then digitally signal processed by, for example, a digital signal processor (DSP), to determine and extract speaker-positional information, and/or room acoustical details, such as, but not limited to, room reverberation, room echo, room noise, room acoustical delay and room frequency response, thereby providing a directive sound enhancement and focusable directive sound capture ability. Additionally, the extracted audio information can be used to enhance the intelligibility of an intentionally generated audio signal in a room, such as when the soundskin device is being used as a speaker phone. That is, the soundskin device can be configured to provide enhanced speakerphone capability by providing room de-reverberation, noise cancelling, equalization and other possible features, such as, but not limited to, speaker identification, or speaker positional information. In one exemplary embodiment, the soundskin device may also provide voice-recognition capabilities, thereby allowing transcription and/or voice-activated control of the functional aspects of the soundskin device, such as, but not limited to volume, equalization, muting or any aspect of the performance of the hardware, firmware or an application running on the personal multi-media electronic device. Generally, digital signal processing can be added to further voice the soundskin output sound to change the equalization, spatialization (for example, stereo separation), phase linearization or other acoustic properties of the delivered sound experience.

Figure 5:
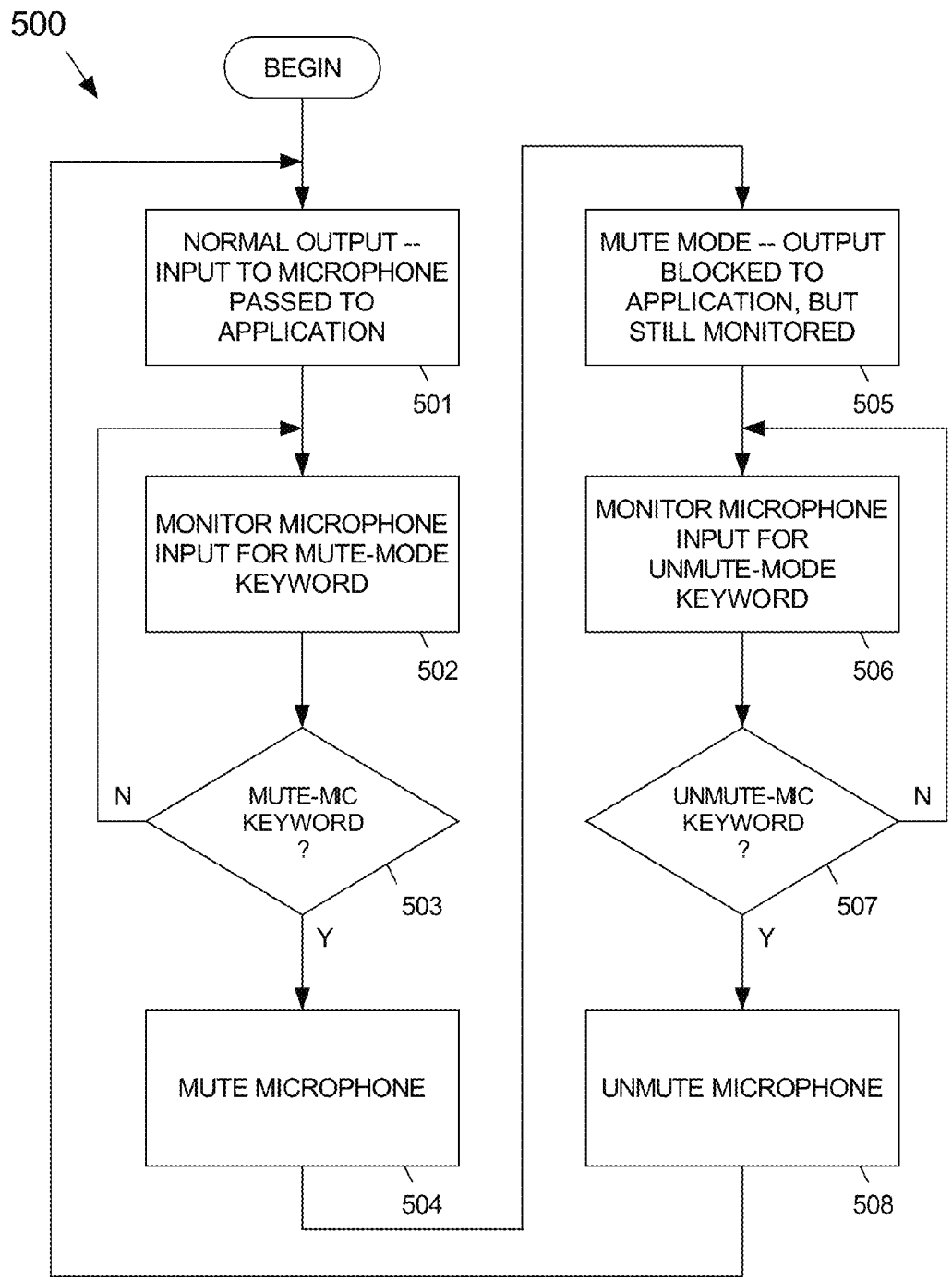
FIG. 5 depicts a flow diagram for one exemplary embodiment of a voice-actuated muting function provided by soundskin device according to the subject matter disclosed herein.

In one exemplary embodiment, muting effectuated by voice command, referred to herein as "smart-muting," only mutes the audio signal that is ultimately passed along to listener at the other end of a conversation while still being capable of listening for and processing subsequent voice commands, such as, but not limited to, "unmute." FIG. 5 depicts a flow diagram 500 for one exemplary embodiment of a voice-actuated muting function provided by soundskin device 100. Process flow begins at 501 where the microphone output is in a normal, unmuted mode and is passed to an application. At 502 and 503, the microphone input is monitored for a particular muting keyword that will place the soundskin device into a mode in which the output of the microphone is muted. If, at 503, it is determined that the muting keyword has been spoken, flow continues to 504 where the microphone output is muted from the application; otherwise, flow returns to 502 for continued monitoring for the particular muting keyword. From 504, flow continues to 505 where the output of the microphone is muted from the application. At 506 and 507, the microphone output is monitored for a particular unmuting keyword that will return the soundskin device to the normal, unmuted mode. If, at 507, it is determined that the unmuting keyword has been spoken, flow continues to 508 where the soundskin device returns to the normal, unmuted mode and 501; otherwise, otherwise, flow returns to 506 for continued monitoring for the unmuting keyword.

Generally, microphones 121 configured in a spatial-diversity arrangement in conjunction with DSP can be used to improve the intelligibility of any intentionally generated user input or environmentally ambient sound that might be used by an application running on the soundskin device, the encased personal multi-media electronic device, or combinations thereof. A plurality of microphones configured in a spatial-diversity arrangement can also be used to record sound from the room and/or to calibrate room acoustics, thereby providing information to the DSP making it possible to provide specific equalization for enhancing a listening experience, such as, but not limited to, removing variations in a frequency response of a room and/or linearizing the phase of the acoustic signal delivered to a listener by removing unwanted sounds, such as ambient and/or background noise. In one exemplary embodiment, the spatial-diversity microphone configuration can be configured to provide a monaural modality.

In one exemplary embodiment, a portion of audio processing device 120 provides two-dimensional and/or three-dimensional tactile and/or haptic feedback 122 to a user such as, but not limited to, vibration that could be generated by, for example, one or more piezo-electric devices, electro-static devices, magneto-static devices, and/or speaker motor or other any other device that creates a physical motion in the case that can be sensed by a user as a vibration, impulse or jerk. The vibration generated by a tactile/haptic portion 122 of audio processing device 120 could also provide haptic abilities for any soft button, hard button, control input, or on-screen touch of any sort, or combinations thereof. The vibration can also be used to enhance a user experience of an application, such as, but not limited to, a video game, movie or audio. Further, vibration can be used to alert a user to any aspect of the operation of either the personal media-media electronic device and/or the soundskin device or even in response to some sound that the microphones have picked up either with or without DSP being applied. Vibration can be used in some way as part of an application itself. Examples might include, but are not limited to, massage, alarm-clock, or as a stimulus for some sort of measurement or trigger of additional hardware or of the environment.

In one exemplary embodiment, power source 160 (FIG. 3) of the soundskin device provides a battery monitoring and charging functionality that optimizes the operating time of both the soundskin device and a pad-type device. That is, the discharge/charge rates of the internal battery of the soundskin device, which powers the amplifier and associated soundskin device electronics, and the battery of the pad-type device, which plays content from an application running on the pad-type device, are balanced so that the battery operating time for the soundskin device and a pad-type device are substantially equal. According to one exemplary embodiment, power source 160 monitors the discharge levels of the soundskin device battery and the pad-type device battery during respective discharge cycles and accumulates data representative of a pair of discharge curves for the soundskin device batteries and the pad-type device batteries. The battery discharging/charging technique used by the soundskin device monitors the current state of the respective batteries state of charge (SOC) and measures the rate of change of the energy of the batteries over time and then uses this data to create two discharge curves predicting the end of playback for each device. The technique then charges either the battery of the soundskin device and/or the battery of the pad-type device so that discharge of the respective batteries occurs at substantially the same time. At the point in which charging of the batteries has compensated any initial discharge time differences to be substantially equal, both batteries are charged in the appropriate proportions to maintain equal playback time until both batteries are fully charged. In another exemplary embodiment, the battery discharge/charge functionality is provided by another component other than power source 160, such as, but not limited to, processing device 120.

Figure 6:
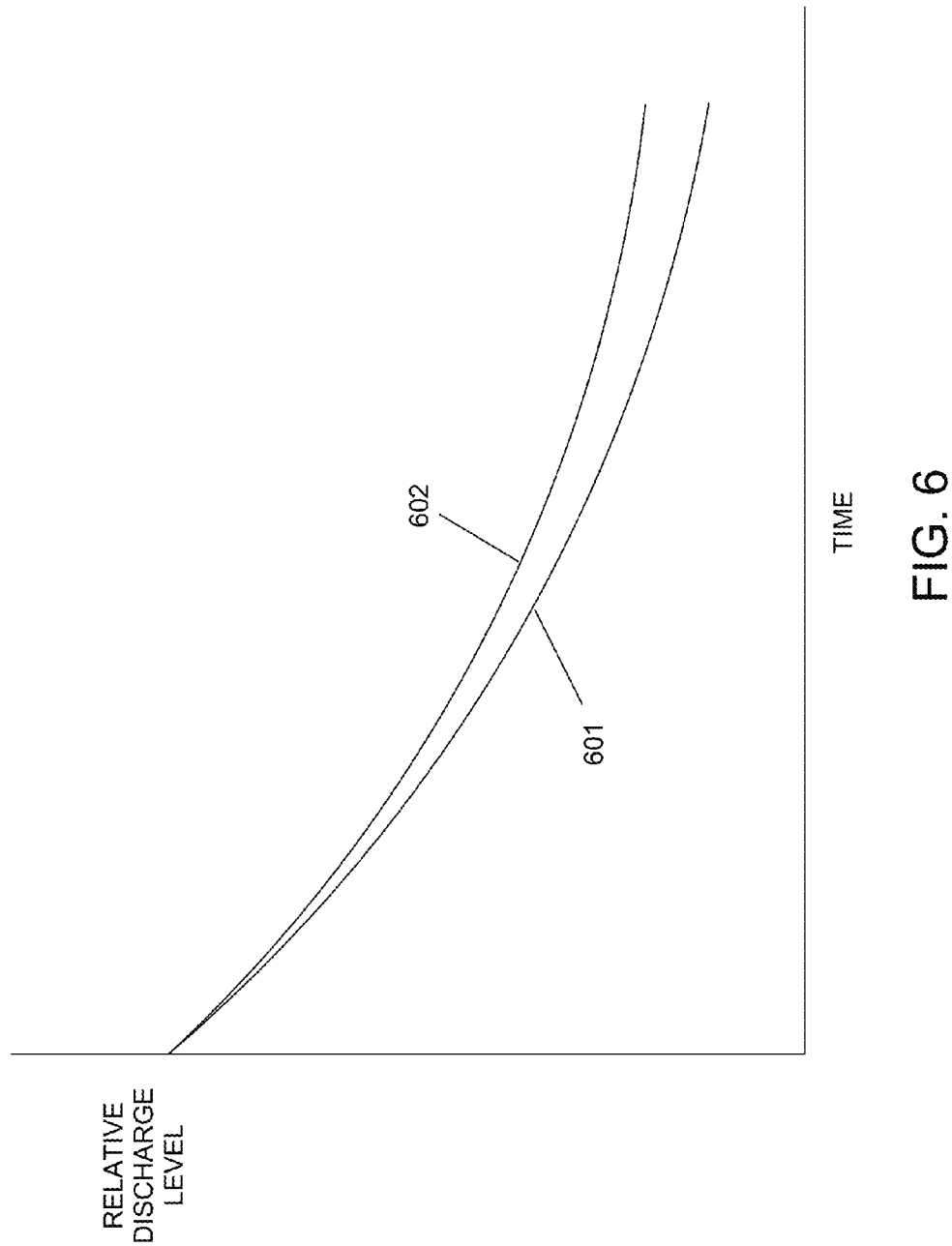
FIG. 6 respectively depicts an exemplary relative discharge level for the battery of a soundskin device and an exemplary relative discharge level for the battery of a pad-type device as a function of time.
Figure 7:
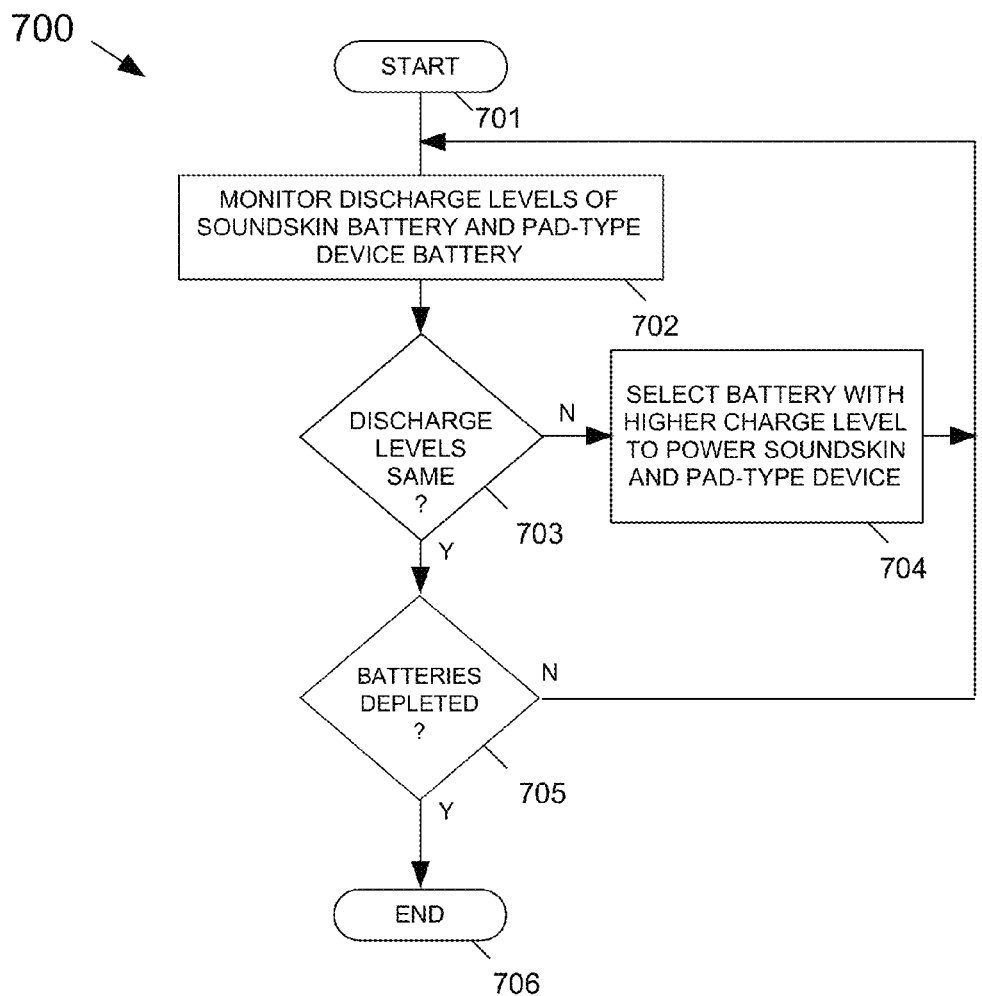
FIG. 7 depicts a flow diagram for a general exemplary process for monitoring the discharge level of the battery of soundskin batteries and the battery of a pad-type device according to the subject matter disclosed herein.
Figure 8:
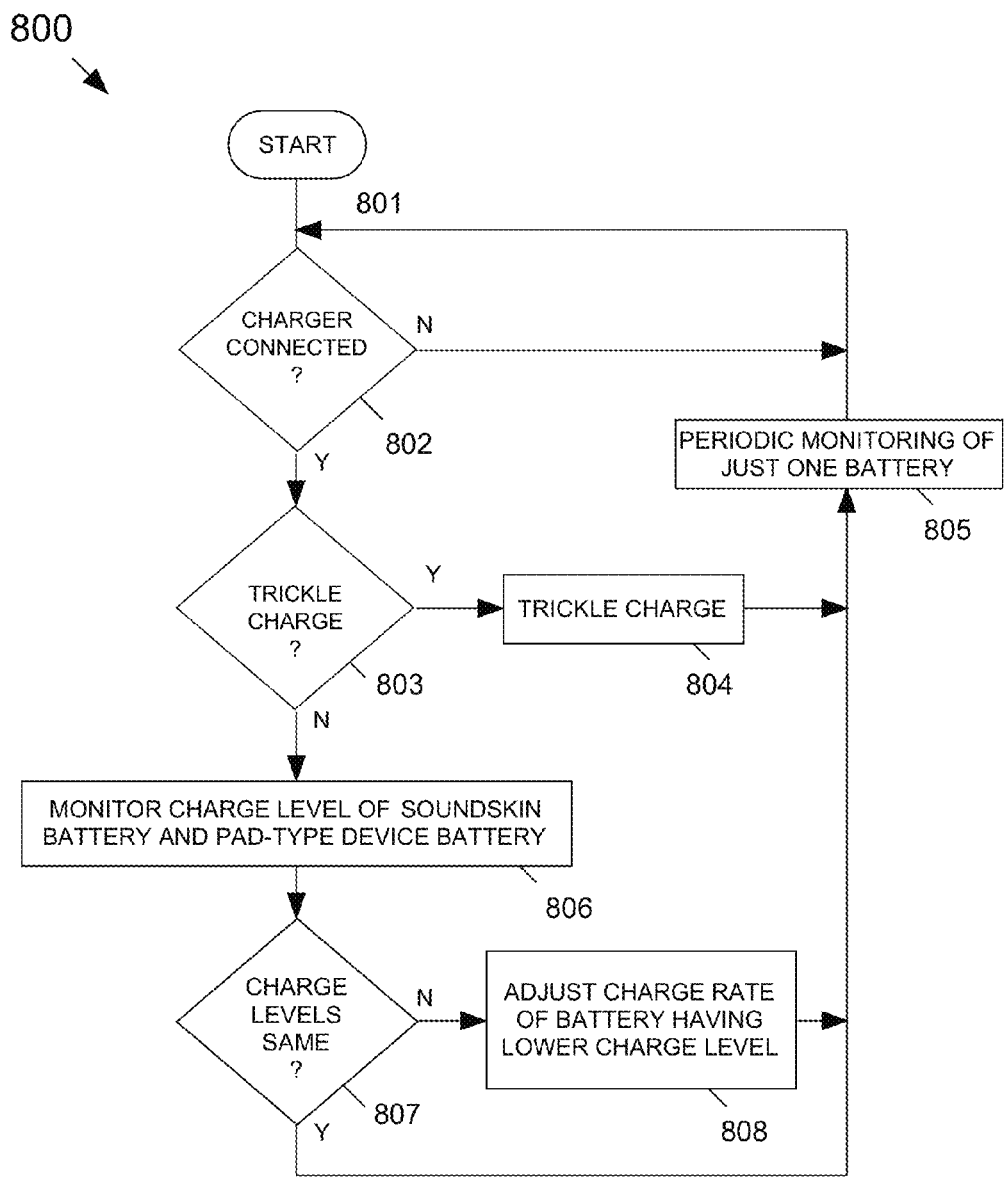
FIG. 8 depicts a flow diagram for a general exemplary process for charging the batteries of a soundskin device and of a pad-type device according to the subject matter disclosed herein.

FIG. 6 respectively depicts an exemplary relative discharge level 601 for the battery of a soundskin device and an exemplary relative discharge level 602 for the battery of a pad-type device as a function of time. FIG. 7 depicts a flow diagram for a general exemplary process 700 for monitoring the discharge level of the battery of soundskin batteries and the battery of a pad-type device. FIG. 8 depicts a flow diagram for a general exemplary process 800 for charging the batteries of a soundskin device and of a pad-type device.

The process of monitoring the discharge levels of the batteries starts in at 701 FIG. 7 when a pad-type device is inserted into a soundskin device and/or when the soundskin device and the pad-type device are powered on. The process flows to 702 where power source 160 monitors the discharge level of the soundskin battery and the discharge level of the pad-type device battery with respect to time. Information relating to the battery chemistry of the pad-type device can be manually selected by a user and/or sensed in a well-known manner by power source 160. As the discharge levels are monitored, it is determined at 703 whether the discharge level of one battery is lower than the discharge level of the other battery. If a difference in discharge levels is determined, flow continues to 704 where power source 160 selects the battery having the higher charge level to power both the soundskin device and the pad-type device to balance discharge levels of the batteries so that the battery operating time for the soundskin device and a pad-type device are substantially equal. Flow then continues from 704 back to 702. If, at 703, no difference in discharge level is detected, flow continues to 705 where it is determined whether the batteries have been depleted. If, at 705, it is determined that the batteries have not been depleted, flow returns to 702. If, at 705, it is determined that the batteries have been depleted, flow continues to 706 where the soundskin device shuts down both the soundskin device and the pad-type device.

The process of monitoring the charging levels of the batteries starts in at 801 FIG. 8 and in one exemplary embodiment is an ongoing background process while the exemplary process depicted in FIG. 7 is performed. Flow continues to 802 where it is determined whether a battery charger is connected to the soundskin device. If not, flow remains at 802. If, at 802, it is determined that a battery charger is connected to the soundskin device, flow continues to 803 where it is determined whether a trickle charge is needed to charge the batteries. If so, flow continues to 804 where a trickle charge of the soundskin battery and the pad-type device battery is used. Flow continues to 805 where periodically, such as about every 15 minutes charge is applied to only one battery so that the charge level of the other battery is monitored to determine where it lies along its charge level curve (FIG. 6). Flow continues to 802.

If, at 803, if is determined that more than a trickle charge is needed to charge the batteries, flow continues to 806 where power source 160 monitors the charge level of the battery of the soundskin device and the battery of the pad-type device. Flow continues to 807 where it is determined whether there is a difference in charge level between the battery of the soundskin device and the battery of the pad-type device. If a difference in charge level is determined at 807, flow continues to 808 where the charge rate of each battery is adjusted so that the battery detected as having the lower charge level receives a higher rate of charge. In one exemplary embodiment, the battery that is determined to be farther to the right (i.e., lower in charge) along the corresponding curve in FIG. 6 receives a higher charge rate. For example, the battery determined to have the lower charge level could receive a 75% greater charging rate that the battery determined to have the greater charge level. In another exemplary embodiment, the proportion allocated to the battery determined to have the lower charge level could be greater than or less than 75%. Regardless of the allocated charge rates, the battery that is determined to have the lower charge level receives a higher charge rate so that both batteries become fully charged at substantially the same time. Flow continues from 808 to 805 where periodically, such as about every 15 minutes charge is applied to only one battery so that the charge level of the other battery is monitored to determine where it lies along its charge level curve (FIG. 6). Flow continues to 802.

If, at 807, no difference in charge levels is detected, flow continues to 805 where periodically, such as about every 15 minutes charge is applied to only one battery so that the charge level of the other battery is monitored to determine where it lies along its charge level curve (FIG. 6). Flow continues to 802.

In one exemplary embodiment, the soundskin device comprises a keyboard (not shown) that is integral to the soundskin device. In another exemplary embodiment, the soundskin device comprises a keyboard (not shown) that is removably coupled to the soundskin device. In still another exemplary embodiment, the soundskin device comprises a keyboard (not shown) that is wirelessly coupled to the soundskin device, such as through an RF link and/or an infrared link.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A system, comprising:
   an enclosing case having a recessed holding well configured to receive and captively hold the entirety of a pad-type device;
   a signal processing device contained in the enclosing case and configured to receive an audio signal from the pad-type device;
   at least one audio transducer device contained in the enclosing case, the at least one audio transducer device being coupled to the signal processing device and configured to generate an audible audio output in response to an audio signal output from the signal processing device; and
   an acoustic waveguide integrated with the enclosing case, the acoustic waveguide coupled to the at least one audio transducer device, and configured to receive the audible audio output from the at least one audio transducer device and to generate an enhanced bass audio output.

2. The system according to claim 1, wherein the enclosing case is configured to support a pad-type device in a semi-vertical position.

3. The system according to claim 2, further comprising at least two microphones configured in a spatial-diversity arrangement.

4. The system according to claim 3, wherein the signal processing device is configured to receive audio input signals from each microphone and provide a directive sound enhancement of the audio input signals based on a room reverberation, a room echo, a room noise, a room acoustic delay, a room frequency response, speaker-positional information, or a combination thereof, that is determined by the signal processing device.

5. The system according to claim 1, further comprising a tactile device, a haptic device, or a combination thereof, coupled to the signal processing device.

6. The system according to claim 1, further comprising a wireless adaptor coupled to the signal processing device, the wireless adaptor providing a wireless link between a device external to the system.

7. The system according to claim 6, wherein the wireless link is a bi-directional wireless link.

8. The system according to claim 6, wherein the external device is at least one audio speaker, a pair of headphones, or a data source.

9. The system according to claim 1, wherein the enclosing case further comprises:
   a first space enclosed by the enclosing case for each audio transducer device, each first space being configured to receive the audio transducer device; and
   a first aperture for each audio transducer device, each first aperture being configured to port the audio output from the audio transducer device to a space external to the enclosing case when the audio transducer device is received in the first space;
   wherein the acoustic waveguide is coupled to each first space, the acoustic waveguide being configured to receive the audio output from a second side of the audio transducer device when the audio transducer device is received in the first space, each acoustic waveguide comprising a length and a width and configured to generate an enhanced audio output from the audio output from the second side of the audio transducer device when the audio transducer device is received in the first space, each enhanced audio output having a bass frequency response that is greater than a base frequency response of the audio output from a first side of the audio transducer device, the acoustic waveguide further comprising:
   an acoustic waveguide mixing region coupled to each acoustic waveguide, the acoustic waveguide mixing region being configured to receive and mix together the enhanced audio output generated from each audio transducer device; and
   a second aperture configured to port the mixed-together enhanced audio output to the space external to the enclosing case.

10. The system according to claim 1, wherein the pad-type device an iPad, an iPhone, a media player, a handheld-computing device, or a handheld multimedia device.

11. The system according to claim 1 further comprising a battery contained within the enclosing case.

12. The system according to claim 10, wherein the signal processing device is configured to control a charging of a battery of a pad-type device received by the enclosing case.

13. A system, comprising:
   an enclosing case comprising a well region configured to receive and captively hold the entirety of a pad-type device;
   at least two microphone transducer devices in the enclosing case, the microphone transducer devices configured to couple a sound output from the pad-type device to the enclosing case; and
   a signal processing device contained in the enclosing case, the signal processing device coupled to the microphone transducer devices, the signal processing device receiving audio input signals from each of the microphone transducer devices and providing to the pad-type device a directive sound enhancement of the audio input signals based on a room reverberation, a room echo, a room noise, a room acoustic delay, a room frequency response, or a speaker-positional information, or a combination thereof, that is determined by the signal processing device.

14. The system according to claim 13, further comprising a tactile device or a haptic device, or a combination thereof, coupled to the signal processing device.

15. The system according to claim 13, further comprising a wireless adaptor coupled to the signal processing device, the wireless adaptor providing a wireless link between a device external to the system.

16. The system according to claim 15, wherein the external device is at least one audio speaker, a pair of headphones, or a data source.

17. The system according to claim 13, further comprising:
   at least one audio transducer device coupled to the signal processing device, the at least one audio transducer device configured to generate an audible audio output in response to an audio signal output from the signal processing device; and
   in which the audio chamber further comprises an acoustic waveguide coupled to the at least one audio transducer device and configured to receive the audible audio output and generating an enhanced bass audio output from the acoustic wave guide.

18. The system according to claim 17, wherein the enclosing case further comprises:
   a first space enclosed by the enclosing case for each audio transducer device, each first space being configured to receive the audio transducer device; and
   a first aperture for each audio transducer device, each first aperture being configured to port the audible audio output from the audio transducer device to a space external to the enclosing case when the audio transducer device is received in the first space;
   wherein the acoustic waveguide is coupled to each first space, the acoustic waveguide being configured to receive the audible audio output from a second side of the audio transducer device when the audio transducer device is received in the first space, each acoustic waveguide comprising a length and a width, defining a chamber configured to generate an enhanced audio output from the audible audio output from the second side of the audio transducer device when the audio transducer device is received in the first space, each enhanced audio output having a bass frequency response that is greater than a base frequency response of the audible audio output from a first side of the audio transducer device, the acoustic waveguide further comprising:
   an acoustic waveguide mixing region coupled to each acoustic waveguide, the acoustic waveguide mixing region configured to receive and mix together the enhanced audio output generated from each audio transducer device; and
   a second aperture configured to port the mixed-together enhanced audio output to the space external to the enclosing case.

19. The system according to claim 13, wherein the pad-type device is an iPad, an iPhone, a media player, a handheld-computing device, or a handheld multimedia device.

20. The system of claim 1, further comprising at least one microphone transducer device, the signal processing device being coupled to the at least one microphone transducer device.

21. The system of claim 1 in which the acoustic waveguide includes a chamber, the recessed holding well constituting a first wall of the chamber and a bottom portion of the enclosing case constituting a second wall of the chamber that is substantially parallel to the first wall.

22. The system of claim 13, further comprising an audio chamber within the enclosing case, the well region constituting a first wall of the audio chamber and a bottom portion of the enclosing case constituting a second wall of the audio chamber that is substantially parallel to the first wall.

23. A case for a pad-type device comprising:
- an enclosing structure shaped to encapsulate at least four edges and a backside of the pad-type device, the enclosing structure further including a recessed well and a bottom casing that is separate from and substantially parallel to a bottom surface of the recessed well;
- at least one audio transducer configured to generate an audio output projecting from a first side of the audio transducer and from a back side of the audio transducer;
- an audio processor configured to drive the audio transducer; and
- an acoustic waveguide integrated into the enclosing structure, the bottom surface of the recessed well constituting a first wall of the acoustic waveguide and the bottom casing of the enclosing structure constituting a second wall of the acoustic waveguide that is substantially parallel to the first wall, the acoustic waveguide being configured to channel the audio output from the back side of the audio transducer to enhance the bass response of the audio transducer.

24. The case of claim 23, in which the at least one audio transducer comprises a first audio transducer and a second audio transducer, and in which the acoustic waveguide is configured:
- to channel audio output of the first audio transducer through a first chamber having an end that is most remote from the first audio transducer;
- to channel audio output of the second audio transducer through a second chamber having an end that is most remote from the second audio transducer; and
- to merge audio output from the first chamber and the second chamber together into a single port at the most remote end of each chamber.

25. The case of claim 23, the enclosing structure further comprising a top casing connected by a hinge to the bottom casing, the top casing, bottom casing, and hinge being configured for the enclosing structure to open and close in a clamshell manner.

26. The case of claim 25, in which the hinge is releasable such that the top casing is removable from the bottom casing.

* * * * *